US009611821B2

(12) United States Patent
Smith (10) Patent No.: US 9,611,821 B2
(45) Date of Patent: Apr. 4, 2017

(54) ENGINE MANIFOLD SENSOR ASSEMBLY (71) Applicants: ILLINOIS TOOL WORKS INC., Glenview, IL (US); Mary Miyamoto-Smith, Manhattan, IL (US)

(72) Inventor: Ronald M. Smith, Manhattan, IL (US)

(73) Assignee: Illinois Tool Works Inc., Glenview, IL (US)

(*) Notice: Subject to any disclaimer, the term of this patent is extended or adjusted under 35 U.S.C. 154(b) by 133 days.

(21) Appl. No.: 14/766,197

(22) PCT Filed: Feb. 8, 2014

(86) PCT No.: PCT/US2014/015447
§ 371 (c)(1),
(2) Date: Aug. 6, 2015

(87) PCT Pub. No.: WO2014/126819
PCT Pub. Date: Aug. 21, 2014

(65) Prior Publication Data
US 2015/0377193 A1 Dec. 31, 2015

Related U.S. Application Data (60) Provisional application No. 61/765,858, filed on Feb. 18, 2013.

(51) Int. Cl.
*B23P 11/00* (2006.01)
*F02M 35/10* (2006.01)
(Continued)

(52) U.S. Cl.
CPC ...... *F02M 35/1038* (2013.01); *F02M 35/104* (2013.01); *F02M 35/10249* (2013.01); *G01L 19/0061* (2013.01); *G01L 19/14* (2013.01)

(58) Field of Classification Search
CPC ......... F02M 35/1038; F02M 35/10249; F02M 35/104; G01L 19/0061; G01L 19/14
See application file for complete search history.

(56) References Cited

U.S. PATENT DOCUMENTS 6,299,661 B1    10/2001   Bloomer
6,487,911 B1*  12/2002   Frackelton ............ G01L 9/0075
                                                        73/714

(Continued)

FOREIGN PATENT DOCUMENTS

DE   102007031980 A1   1/2009

OTHER PUBLICATIONS

ISR and WO for PCT/US2014/015447 mailed May 30, 2014.

*Primary Examiner* — Marguerite McMahon
(74) *Attorney, Agent, or Firm* — Paul F. Donovan (57) ABSTRACT A sensor assembly is configured to be securely connected to a portion of an engine, for example, of a vehicle. The sensor assembly may include a main body, a connector shroud extending from the main body, a port extending from the main body, a deflectable locking member extending from the main body, and a radial tab extending from the main body. The connector shroud is configured to receive an electrical connector that electrically connects the sensor assembly to an engine control unit. The port is configured to be inserted into an opening formed in the portion of the engine. The deflectable locking member and the radial tab cooperate to securely connect the sensor assembly to the portion of the engine, such as through rotation of the sensor assembly in relation to the engine.

20 Claims, 10 Drawing Sheets (51) Int. Cl.
*F02M 35/104* (2006.01)
*G01L 19/00* (2006.01)
*G01L 19/14* (2006.01)

(56) References Cited

U.S. PATENT DOCUMENTS

| | | | | |
|---|---|---|---|---|
| 7,426,869 B2* | 9/2008 | Fujimoto | ............. | G01L 19/003 |
| | | | | 73/700 |
| 7,478,560 B2* | 1/2009 | Kuznia | ............... | G01L 19/0092 |
| | | | | 73/708 |
| 7,690,262 B2* | 4/2010 | Nakabayashi | ........... | G01K 1/18 |
| | | | | 73/708 |
| 7,743,750 B2* | 6/2010 | Ritz | ................... | F02M 37/0011 |
| | | | | 123/509 |
| 8,991,352 B2* | 3/2015 | Kaiser | ................... | F02M 25/06 |
| | | | | 123/184.21 |
| 9,003,891 B2* | 4/2015 | Frank | ..................... | G01D 11/30 |
| | | | | 403/288 |
| 9,074,564 B2* | 7/2015 | Lim | ................. | F02M 35/10144 |
| 2005/0022771 A1 | 2/2005 | Cicone | | |
| 2010/0192696 A1 | 8/2010 | Schlitzkus et al. | | |
| 2011/0258835 A1* | 10/2011 | Vargha | ..................... | F16B 5/02 |
| | | | | 29/525.01 |

* cited by examiner

ENGINE MANIFOLD SENSOR ASSEMBLY

RELATED APPLICATIONS

This application is a National Phase of PCT/US2014/015447 filed Feb. 8, 2014 and relates to and claims priority benefits from U.S. Provisional Patent Application No. 61/765,858 filed Feb. 18, 2013, which is hereby incorporated by reference in its entirety.

FIELD OF EMBODIMENTS OF THE DISCLOSURE

Embodiments of the present disclosure generally relate to a sensor assembly configured to be secured to a portion of a vehicle, such as a portion of an engine, such as that of an automobile; and, more particularly, to a sensor assembly that may be secured to a portion of the engine without any separate tools or fasteners.

BACKGROUND

Various vehicles, such as automobiles, include engines, such as internal combustion engines. In many cases, a sensor may be secured to an engine, or a portion of the engine. The sensor is typically secured to an engine through the use of standard fasteners, such as screws or bolts, that may be engaged by a socket wrench, for example.

As one example, a pressure sensor may be secured to an intake manifold of an engine to monitor pressure of incoming air that is utilized for combustion. The intake or inlet manifold supplies a mixture of fuel and air to cylinders of the engine. The intake manifold is configured to evenly distribute a combustion mixture of fuel and air, or just air in a direct injection engine, to each intake port in a cylinder head. The even distribution of fuel and air, for example enhances the efficiency and performance of the engine.

A manifold absolute pressure (MAP) sensor is an example of a pressure sensor that may be secured to the intake manifold. MAP sensors and the like typically include a port, which may protrude from the bottom of the sensor. The port typically includes a hollow cylinder and a seal, such as an O-ring. The port is configured to be pushed into an opening in the intake manifold. A mounting bracket typically protrudes from the side of the sensor and allows the sensor to be fastened and secured to the intake manifold through one or more separate and distinct fasteners, such as screws or bolts. The sensor also typically includes a connector shroud, which may be an electrical receptacle that allows the sensor to be connected to an electrical connector so that the sensor may communicate with an engine control unit.

A typical mounting bracket of a MAP sensor includes a metal compression limiter, similar to a bushing, that may be an integral part of the molded plastic housing of the MAP sensor. The mounting fastener, such as a screw, passes through the compression limiter. As such, the compression limiter is configured to withstand a compressive load of the screw head as the screw is torqued into a securing position.

Thus, in order to secure a MAP sensor to an intake manifold, a metal screw is typically passed through a metal compression limiter in the sensor. The metal screw then passes into a reciprocal threaded metal channel in the intake manifold in order to securely connect the MAP sensor to the intake manifold.

However, each of the separate and distinct components used to connect the MAP sensor to the intake manifold increase the costs of assembly. Further, a manufacturer typically needs a separate and distinct tool to securely connect the MAP sensor to the intake manifold. As such, the process of securing the MAP sensor to the intake manifold may prove to be labor-intensive and costly.

SUMMARY OF EMBODIMENTS OF THE DISCLOSURE

Certain embodiments of the present disclosure provide a sensor assembly configured to be securely connected to a portion of a vehicle, such as a portion of an engine, transmission, driver assist assembly, and the like. The sensor assembly may include a main body, a connector shroud extending from the main body, a port extending from the main body, a deflectable locking member extending from the main body, and a radial tab extending from the main body. The connector shroud is configured to receive an electrical connector that electrically connects the sensor assembly to an engine control unit, for example. The port is configured to be inserted into an opening formed in the portion of the engine, for example. The deflectable locking member and the radial tab cooperate to securely connect the sensor assembly to the portion of the engine.

In at least one embodiment, the deflectable locking member may include a locking latch extending from a distal end of a deflection beam that is separated from the main body by a gap. The locking latch is configured to securely latch to a catch of the portion of the engine when the sensor assembly is rotated into a securing position with respect to the portion of the engine.

The deflectable locking member may also include a blunted protuberance inwardly directed toward the main body. The blunted protuberance may be configured to limit deflection of the deflection beam.

The radial tab may be configured to be slidably received within an arcuate slot formed in the portion of the engine. For example, the radial tab may include a leading end configured to abut into a barrier wall of the portion of the engine when the sensor assembly is securely connected to the portion of the engine.

The sensor assembly may be devoid of a compression limiter. The sensor assembly may be rotated with respect to the portion of the engine in a securing direction in order to securely connect the sensor assembly to the portion of the engine. The sensor assembly may be configured to securely connect to the portion of the engine without the use of a separate and distinct tool or a separate and distinct fastener.

Certain embodiments of the present disclosure provide an engine system that may include an intake manifold including an opening and a sensor-securing wall surrounding at least a portion of the opening. The sensor-securing wall may include a catch and an arcuate slot. The engine system may also include a sensor assembly configured to be securely connected to the intake manifold.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Figure 1:
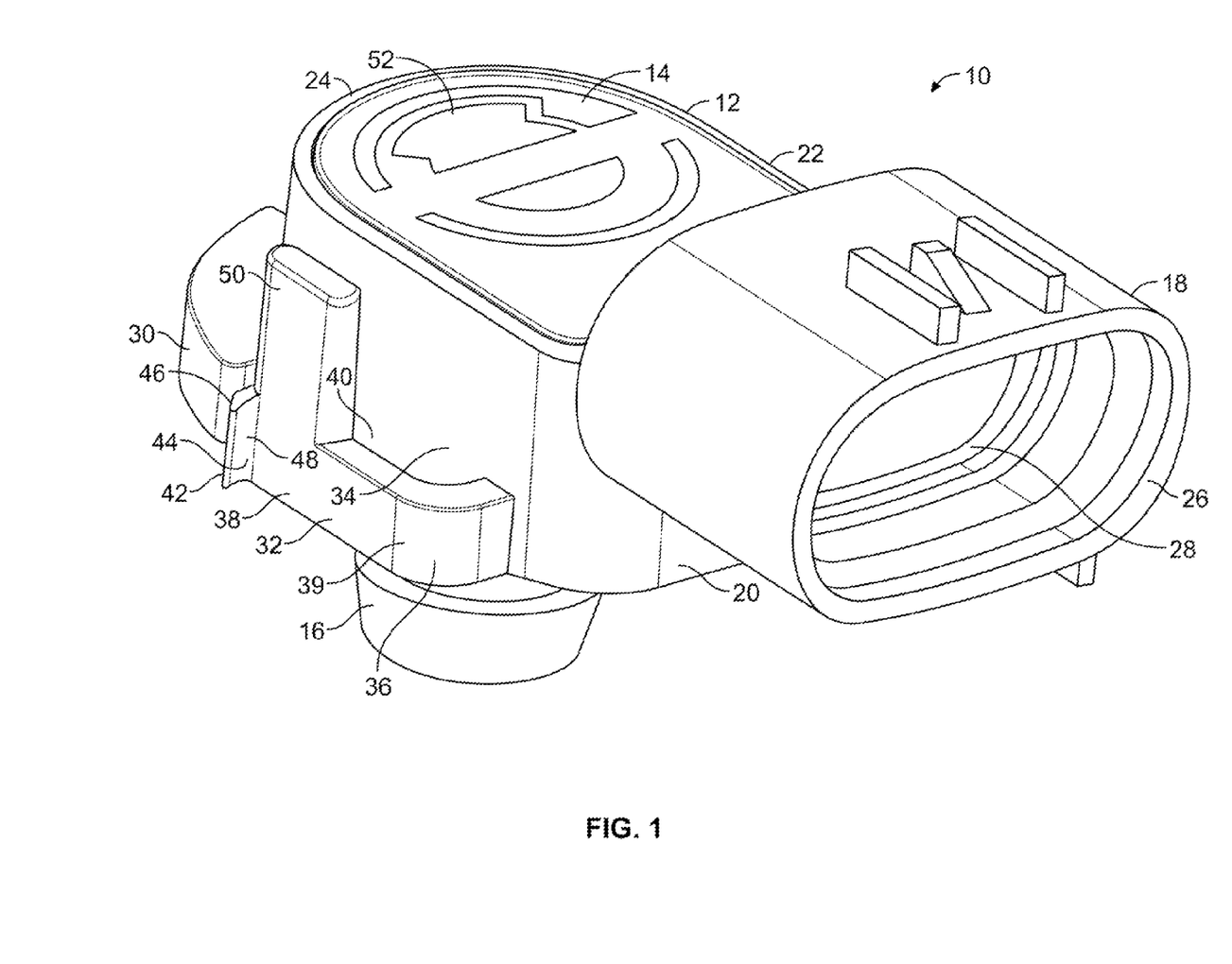
FIG. 1 illustrates a perspective top view of a sensor assembly, according to an embodiment of the present disclosure.

FIG. 1 illustrates a perspective top view of a sensor assembly 10, according to an embodiment of the present disclosure. The sensor assembly 10 may be a manifold absolute pressure (MAP) sensor assembly configured to be secured to an intake manifold of an internal combustion engine, for example. Alternatively, the sensor assembly 10 may be various other types of sensors configured to be secured to a portion of various other portions of a vehicle, such as a transmission, driver assist assembly, and the like. The sensor assembly 10 may be formed of plastic and/or metal.

The sensor assembly 10 includes a housing 12 that includes a main body 14 connected to a port 16 and a connector shroud 18. The port 16 extends from a bottom 20 of the main body 14 and is configured to be inserted into a channel or opening of an intake manifold, for example. The connector shroud 18 extends from an end 22 of the main body 14. As shown in FIG. 1, the connector shroud 18 and the port 16 may connect to the main body 14 at a right angle with respect to one another. As such, the sensor assembly 10 may resemble an L-shape. Alternatively, the connector shroud 18 and the port 16 may connect to the main body 14 at various other orientations. For example the connector shroud 18 may connect to the end 22 of the main body 14, while the port 16 connects at an opposite end 24 of the main body 14 such that the connector shroud 18 and the port 16 are in-line with one another.

The connector shroud 18 may include an outer perimeter wall 26 that defines an internal cavity 28. Electrical contacts may be secured within the internal cavity 28, and are configured to mate with reciprocal contacts of a plug, for example, that may electrically connect the sensor assembly 10 to an engine control unit (not shown). As such, the engine control unit may communicate with the sensor assembly 10.

A radial tab 30 may radially and outwardly extend from the main body 14 proximate to the end 24. Additionally, a deflectable locking member 32 may outwardly extend from a lateral wall 34 of the main body 14. The deflectable locking member 32 may include a clearance beam 36 that outwardly extends from the main body 14 in a perpendicular fashion. The clearance beam 36 may connect to a deflection beam 38 through an arcuate transition 39. The clearance beam 36 ensures that a gap 40 exists between an inner surface of the deflection beam 38 and the lateral wall 34 of the main body 14. When an inwardly-directed force is exerted into the deflection beam 38, the deflection beam 30 may deflect into the gap 40 toward the lateral wall 34 of the main body 14, pivoting about the resilient arcuate transition 39.

A locking latch 42 extends from a distal end 44 of the deflection beam 38. The locking latch 42 may include a leading ramped distal surface 46 that integrally connects to a trailing straight ledge 48. Additionally, an extended tab 50 may upwardly extend from the deflection beam 38 proximate to the distal end 44. The extended tab 50 may extend from the deflection beam 38 to a level that is at or above a height of an upper surface 52 of the main body 14. Alternatively, the entire height of the deflectable locking member 32 may extend to the height of the upper surface 52 of the main body 14. Also, alternatively, the extended tab 50 may extend to a level that is below the height of the upper surface 52. The extended tab 50 may abut against portions of an intake manifold when the sensor assembly 10 is securely connected thereto. As such, the extended tab 50 may be configured to provide additional securing support to the sensor assembly 10 in relation to the intake manifold. Alternatively, the sensor assembly 10 may not include the extended tab 50.

The radial tab 30 and the locking latch 42 may be integrally formed and molded with the main body 14. For example, the radial tab 30 and the locking latch 42 may be formed through an injection molding process.

Figure 2:
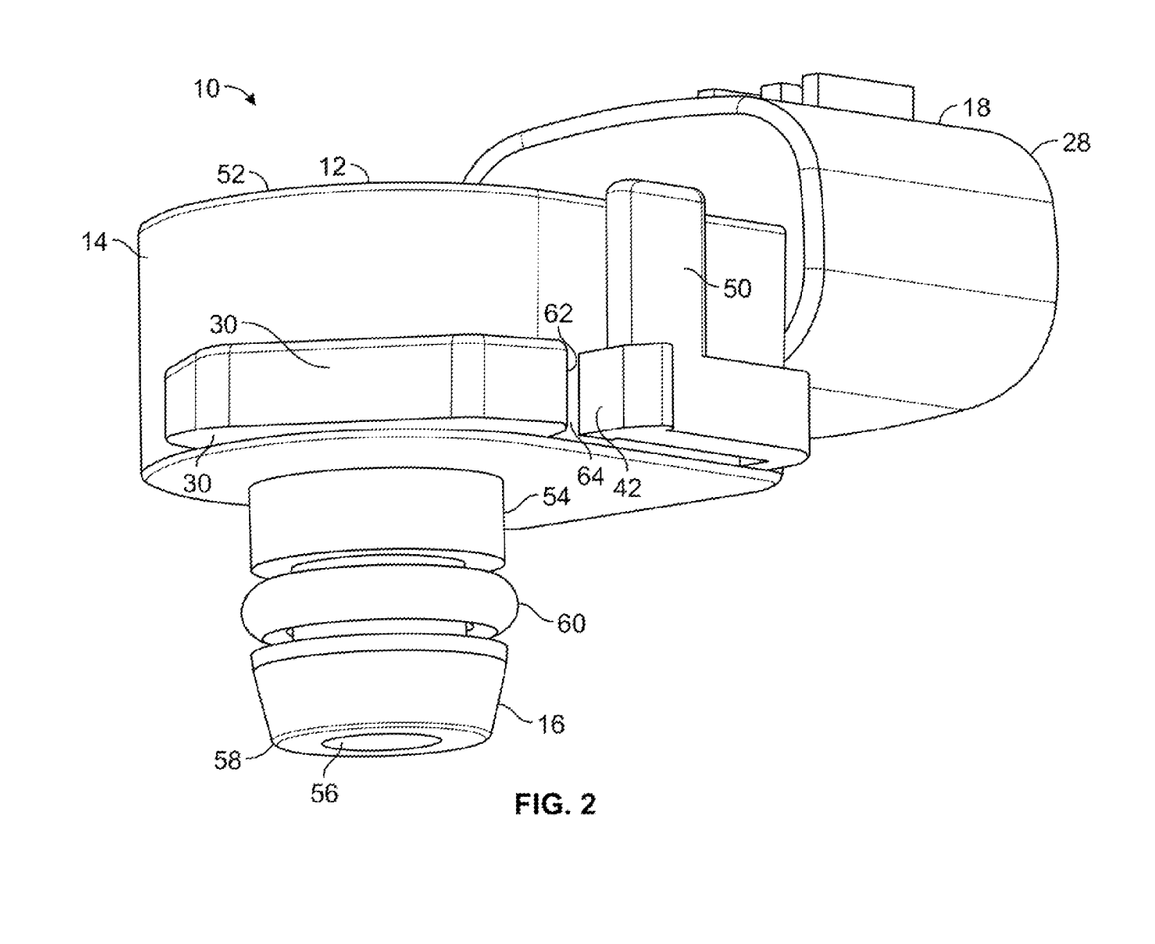
FIG. 2 illustrates a perspective bottom view of a sensor assembly, according to an embodiment of the present disclosure.

FIG. 2 illustrates a perspective bottom view of the sensor assembly 10, according to an embodiment of the present disclosure. The port 16 may include a tube 54 defining an internal channel 56. A distal end 58 of the tube 54 may be beveled, in order to facilitate ease of insertion into an opening of an intake manifold, for example. A circumferential seal 60, such as an O-ring, may be secured around an outer portion of the tube 54. The seal 60 is configured to provide a sealing connection with an internal surface of the intake manifold that defines the opening. As shown in FIG. 2, the radial tab 30 includes an end 62 that is separated from the locking latch 42 by a gap 64.

Figure 3:
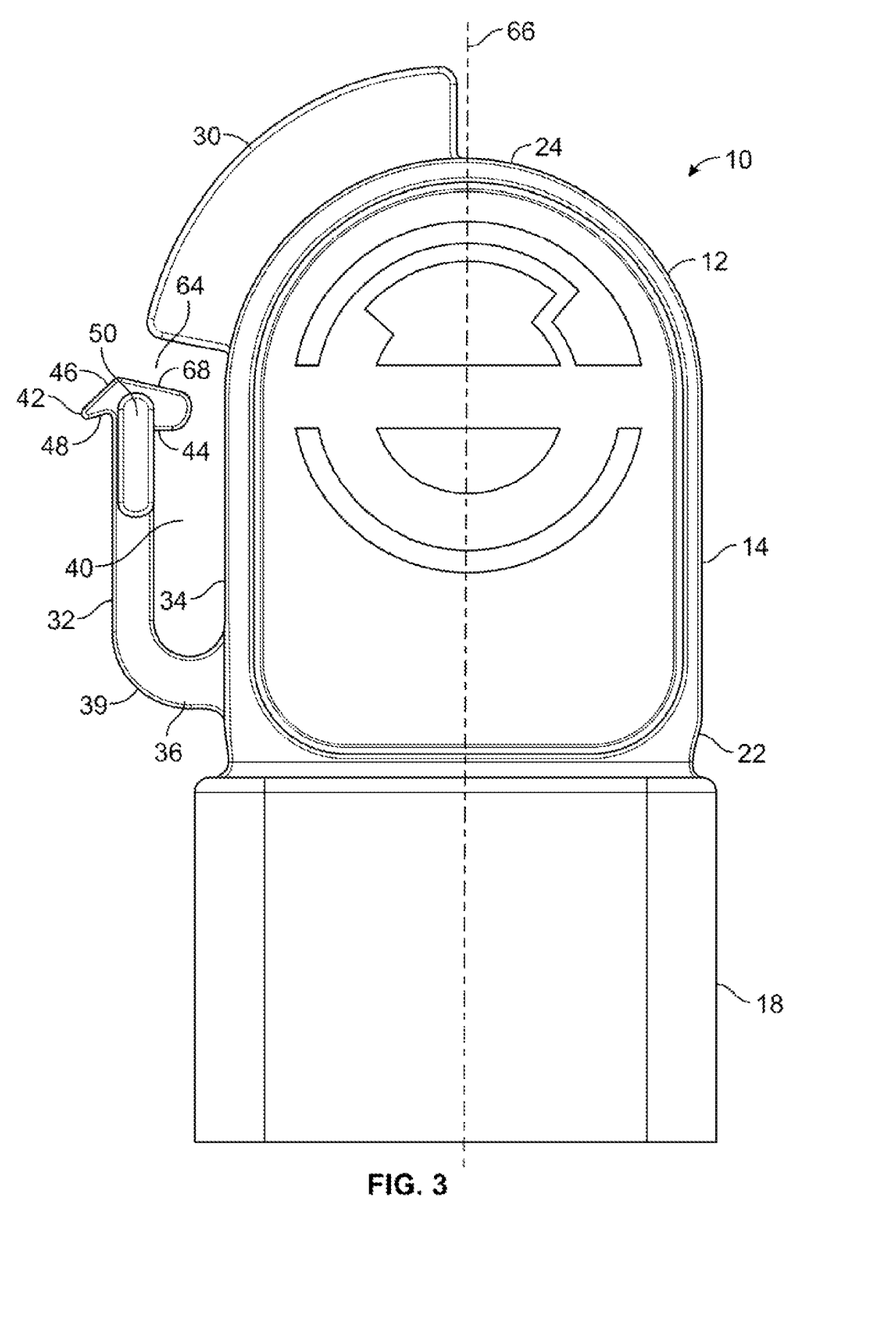
FIG. 3 illustrates a top view of a sensor assembly, according to an embodiment of the present disclosure.

FIG. 3 illustrates a top view of the sensor assembly 10, according to an embodiment of the present disclosure. The radial tab 30 may radially extend from the main body 14 over an arcuate angle of approximately 90°. Optionally, the radial tab 30 may radially extend from the main body 14 over an arcuate angle that is greater or less than 90°. The radial tab 30 is separated from the deflectable locking member 32 by the gap 64.

The ramped distal surface 46 extends outwardly from the distal end 44 of the locking latch 42 in a direction that is away from a longitudinal axis 66 of the sensor assembly 10. Additionally, the locking latch 42 may include a blunted protuberance 68 that extends inwardly from the distal end 44 toward the lateral wall 34.

Figure 4:
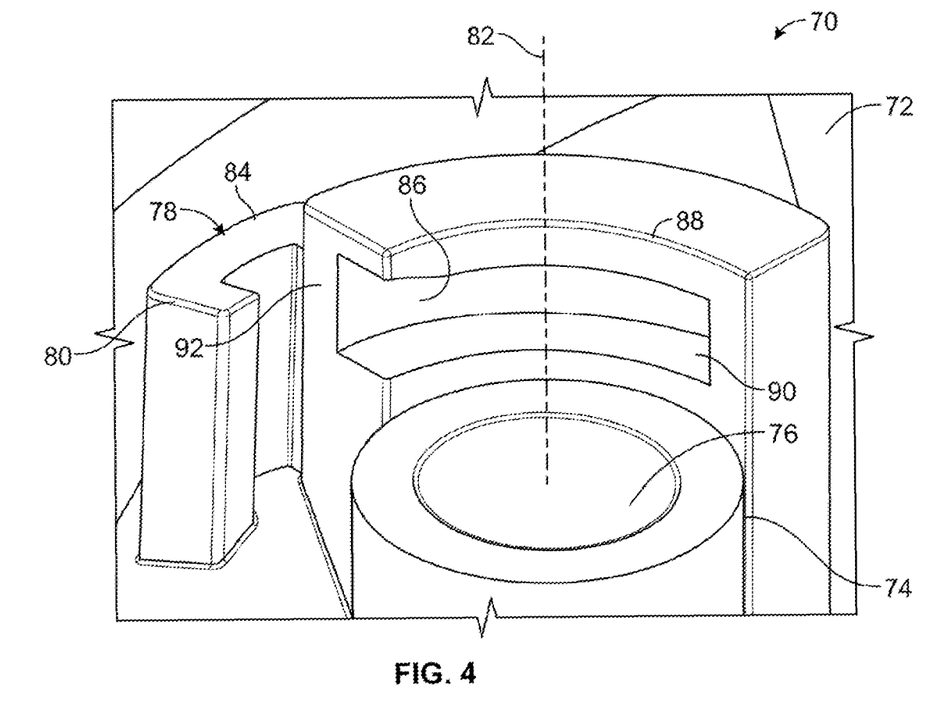
FIG. 4 illustrates a perspective top view of an intake manifold, according to an embodiment of the present disclosure.

FIG. 4 illustrates a perspective top view of an intake manifold 70, according to an embodiment of the present disclosure. The intake manifold 70 includes a manifold housing 72 having a tubular wall 74 defining an opening 76. The port 16 of the sensor assembly 10 (shown in FIGS. 1 and 2) is configured to be inserted into the opening 76.

A sensor-securing wall 78 may be radially positioned around the tubular wall 74. The sensor-securing wall 78 may be taller than the tubular wall 74, as shown in FIG. 4. The sensor-securing wall 78 may include a straight catch 80 that may be directed toward the tubular wall 74. For example, the straight catch 80 may be directed toward a central axis 82 of the opening 76, around which the tubular wall 74 is radially formed. The catch 80 is configured to securely latch or catch onto the locking latch 42 of the sensor assembly 10 (shown in FIGS. 1-3).

The catch 80 may connect to an arcuate wall 84 that may be spaced from the tubular wall 74 and generally conform to the curvature of the tubular wall 74. An arcuate slot or channel 86 may be formed through at least a portion of the arcuate wall 84. The arcuate slot 86 may be defined between upper and lower panels 88 and 90, respectively, which may be perpendicular to an upright portion 92 of the arcuate wall 84. As shown, the upright portion 92 may be vertically oriented, while the upper and lower panels 88 and 90 may be horizontally oriented. The arcuate slot 86 is configured to receive the radial tab 30 of the sensor assembly 10 (shown in FIGS. 1-3).

Figure 5:
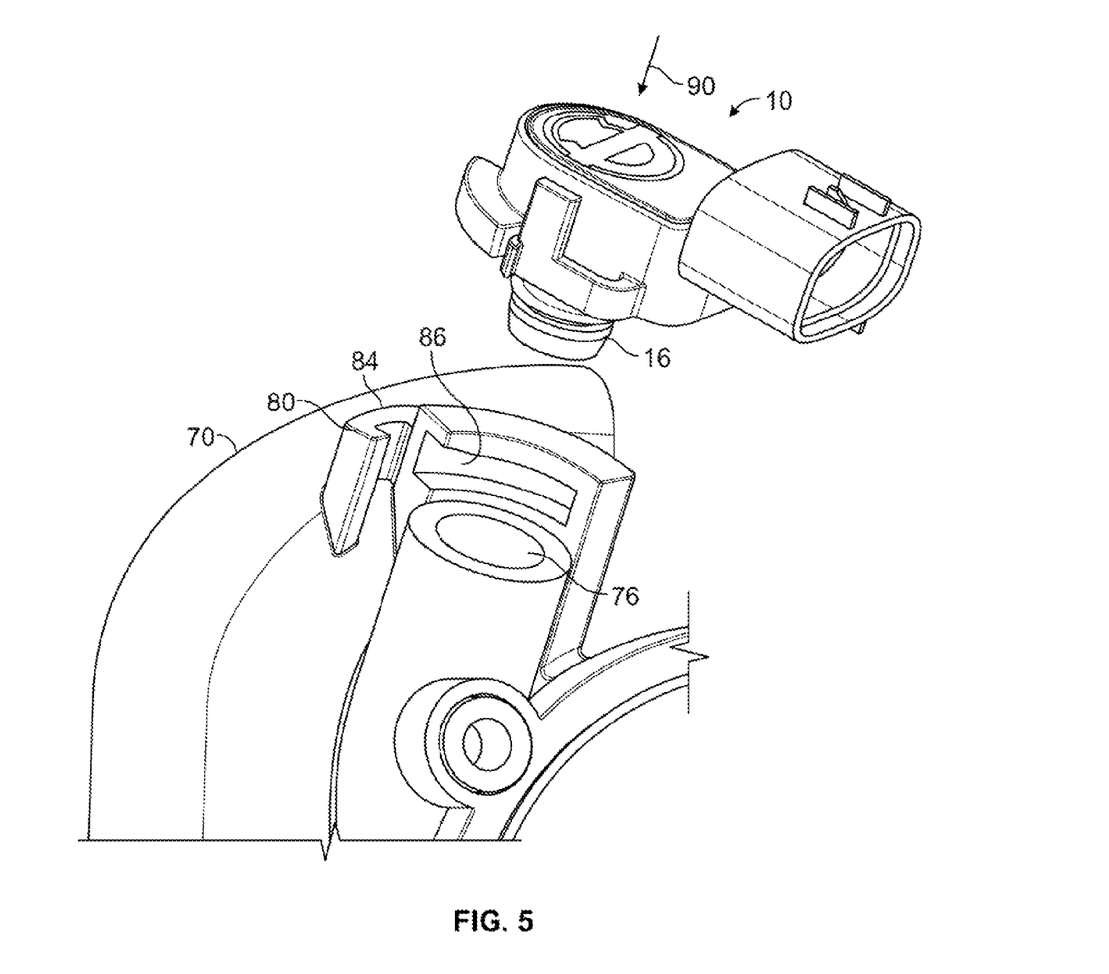
FIG. 5 illustrates a perspective top view of a sensor assembly positioned over an intake manifold, according to an embodiment of the present disclosure.

FIG. 5 illustrates a perspective top view of the sensor assembly 10 positioned over the intake manifold 70, according to an embodiment of the present disclosure. The sensor assembly 10 and the intake manifold 70 form at least a part of an engine system. As shown, the port 16 of the sensor assembly 10 is aligned with the opening 76 formed in the intake manifold 70. In order to secure the sensor assembly 10 to the intake manifold 70, the sensor assembly 10 is urged toward the intake manifold 70 in the direction of arrow 70, such that the port 16 passes into the opening 76. The port 16 is pushed into the opening 76 until a portion of the sensor assembly 10 seats on upper edges of the tubular wall 74, thereby preventing further movement of the sensor assembly 10 into the intake manifold 70.

Figure 6:
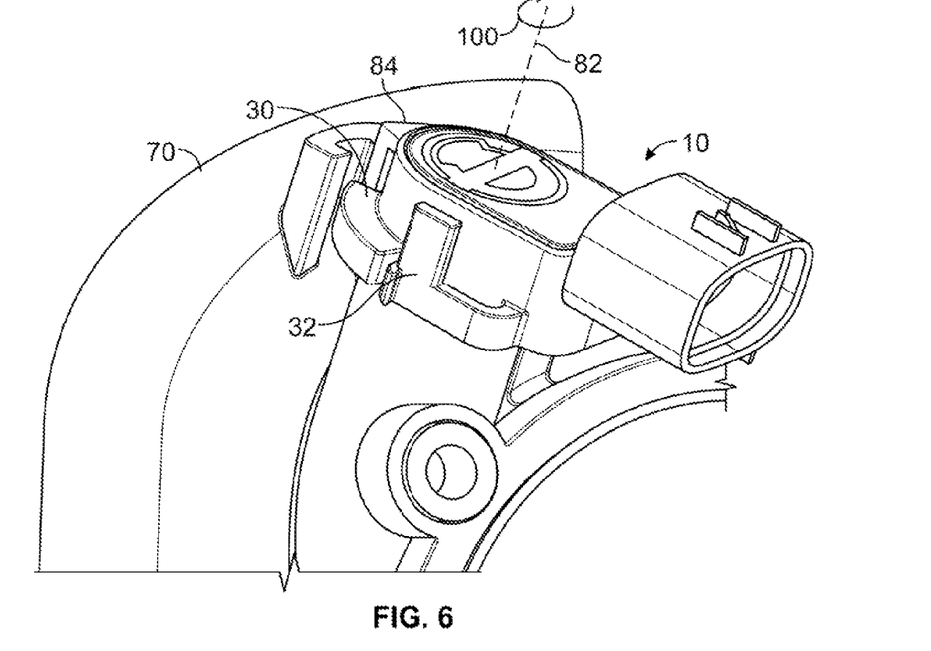
FIG. 6 illustrates a perspective top view of a sensor assembly connected to an intake manifold in an unsecured position, according to an embodiment of the present disclosure.

FIG. 6 illustrates a perspective top view of the sensor assembly 10 connected to the intake manifold 70 in an unsecured position, according to an embodiment of the present disclosure. As shown, the port 16 (shown in FIG. 5) has been inserted into the opening 76 (shown in FIG. 5) of the intake manifold 70. In this position, the radial tab 30 is aligned with the arcuate slot 86 of the wall 84. In order to secure the sensor assembly 10 to the intake manifold 70, the sensor assembly 10 is simply grasped and rotated about and with respect to the central axis 82 of the opening 76 of the intake manifold 70 in the direction of arc 100, as explained in detail below.

Figure 7:
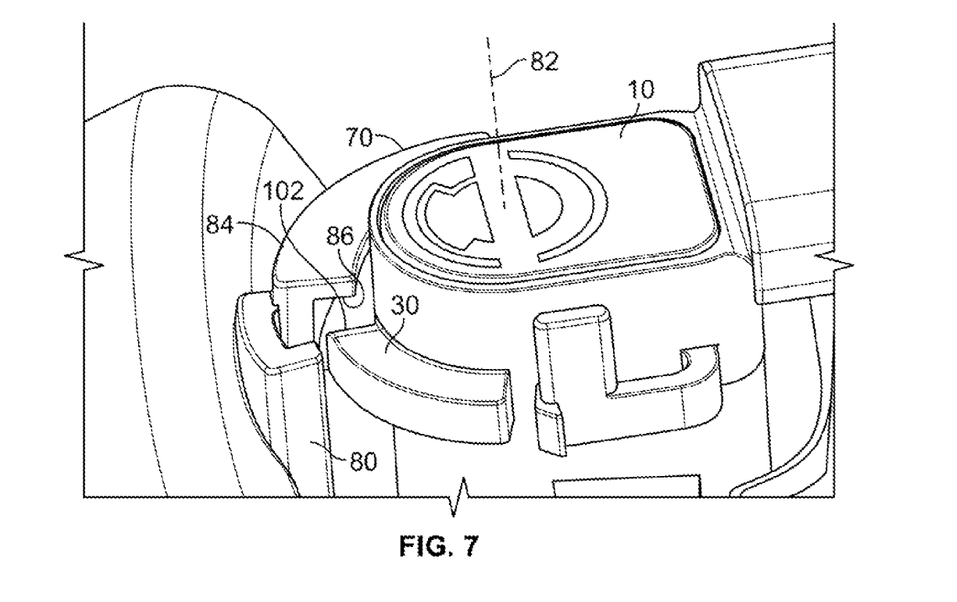
FIG. 7 illustrates a perspective top view of a sensor assembly connected to an intake manifold in an unsecured position with a radial tab of the sensor assembly aligned with an arcuate slot of the intake manifold, according to an embodiment of the present disclosure.

FIG. 7 illustrates a perspective top view of the sensor assembly 10 connected to the intake manifold 70 in the unsecured position with the radial tab 30 of the sensor assembly 10 aligned with the arcuate slot 86 of the intake manifold 70, according to an embodiment of the present disclosure. As shown, a leading end 102 of the radial tab 30 is proximate to the arcuate slot 86 and is poised to be inserted therein.

Figure 8:
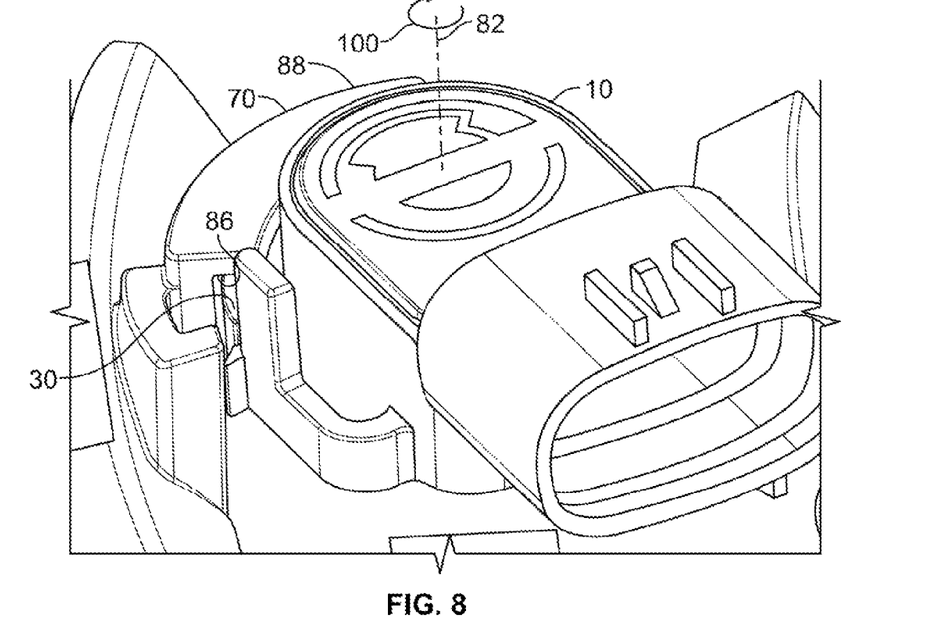
FIG. 8 illustrates a perspective top view of a sensor assembly connected to an intake manifold in an intermediate position, according to an embodiment of the present disclosure.

FIG. 8 illustrates a perspective top view of the sensor assembly 10 connected to the intake manifold 70 in an intermediate position, according to an embodiment of the present disclosure. The sensor assembly 10 has been rotated such that the radial tab 30 has been slid into the arcuate slot 86. As such, at least a portion of the radial tab 30 is trapped between the upper and lower panels 88 and 90 (lower panel 90 is hidden from view in FIG. 8). Consequently, the sensor assembly 10 is prevented from shifting vertically with respect to the intake manifold 70. In order to securely connect the sensor assembly 10 to the intake manifold 70, the sensor assembly 10 is further rotated about the central axis 82 of the opening 76 (shown in FIG. 5) in the direction or arc 100.

Figure 9:
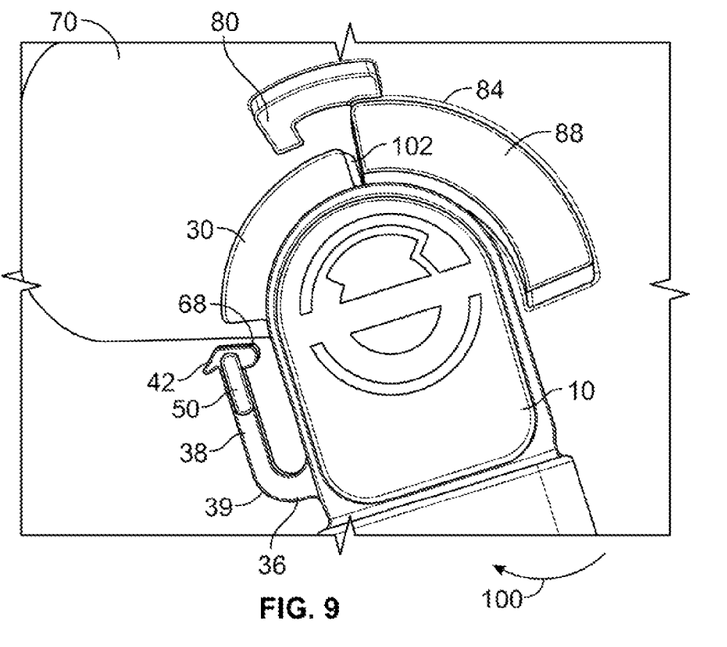
FIG. 9 illustrates a top view of a sensor assembly connected to an intake manifold in an unsecured position, according to an embodiment of the present disclosure.

FIG. 9 illustrates a top view of the sensor assembly 10 connected to the intake manifold 70 in an unsecured position, according to an embodiment of the present disclosure. As shown, the leading end 102 of the radial tab 30 of the sensor assembly 10 is aligned with the arcuate slot 86 (shown in FIGS. 5, 7, and 8, for example). In order to securely latch the sensor assembly 10 to the intake manifold 70, an individual may grasp any portion of the sensor assembly 10 and rotate the sensor assembly 10 in relation to the intake manifold 70 in the direction of arc 100. As the sensor assembly 10 is rotated in such a manner, the radial tab 30 slides into the arcuate slot 86 between the upper and lower panels 88 and 90.

Figure 10:
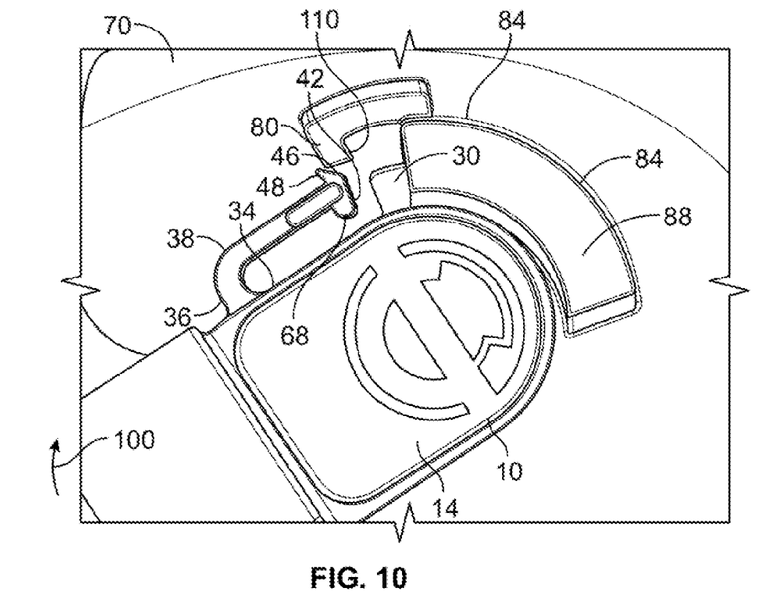
FIG. 10 illustrates a top view of a sensor assembly connected to an intake manifold in an intermediate position, according to an embodiment of the present disclosure.

FIG. 10 illustrates a top view of the sensor assembly 10 connected to the intake manifold 70 in an intermediate position, according to an embodiment of the present disclosure. As shown, a majority of the radial tab 30 is positioned within the arcuate slot 86 between the upper and lower panels 88 of the arcuate wall 84. In this position, the ramped surface 46 of the locking latch 42 abuts into the catch 80. In order to fully secure the sensor assembly 10 to the intake manifold 70, the individual continues to rotate the sensor assembly 10 in relation to the intake manifold 70 in the direction of arc 100. With continued urging in the direction of arc 100, the ramped surface 46 of the locking latch 42 slides over an inner surface of the catch 80, which forces the deflection beam 38 to inwardly deflect towards the side 34 of the main body 14. With continued rotation in the direction of arc 100, the locking latch 42 continues to slide over the inner surface of the catch 80 until the straight ledge 48 encounters a trailing straight ledge 110 of the catch 80. As such, the deflection beam 38 flexes back to an at-rest position, and the interface between the straight ledge 48 of the locking latch 42 and the trailing straight ledge 110 of the catch 80 prevents the sensor assembly 10 from retreating back in a direction that is opposite the direction of arc 100.

Figure 11:
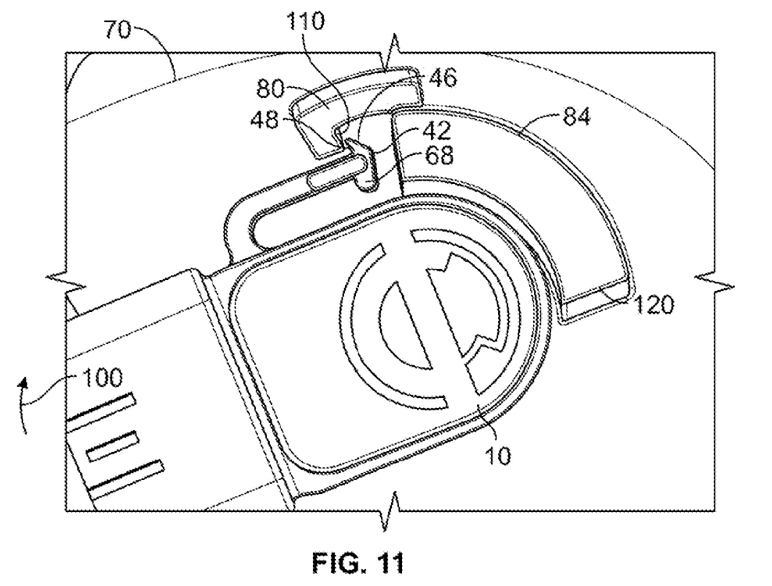
FIG. 11 illustrates a top view of a sensor assembly securely connected to an intake manifold, according to an embodiment of the present disclosure.

FIG. 11 illustrates a top view of the sensor assembly 10 securely connected to the intake manifold 70, according to an embodiment of the present disclosure. As shown, the straight ledge 48 of the locking latch 42 abuts against the trailing straight ledge 110 of the catch 80. Further, the radial tab 30 (hidden from view in FIG. 11) is fully retained within the arcuate slot 86 (hidden from view in FIG. 11). The leading end 102 of the radial tab 30 may abut against a barrier end wall 120 of the arcuate wall 84. The abutting nature of the radial tab 30 into the barrier end wall 120 prevents the sensor assembly 10 from being further rotated in the direction of arc 100, while the interface between the locking latch 42 and the catch 80 prevents the sensor assembly 10 from retreating in a direction that is opposite the direction of arc 100. As such, the locking latch 42 and the radial tab 30 of the sensor assembly 10 cooperate with the catch 80 and the arcuate wall 84 of the intake manifold 70 to securely connect the sensor assembly 10 to the intake manifold 70.

The blunted protuberance 68 prevents the deflection beam 38 from being overly-deflected toward the lateral wall 34 of the main body 14 of the sensor assembly 10. For example, because the blunted protuberance 68 extends inwardly toward the lateral wall 34 from the distal end 44 of the locking latch 42, the blunted protuberance 68 would abut against the lateral wall 34 before other portions of the deflection beam 38, thereby ceasing further deflection. As such, the blunted protuberance 68 protects the deflection beam 38 from damage, such as snapping due to over-deflection. Alternatively, the locking latch 42 may not include the blunted protuberance 68.

Referring to FIGS. 1-11, the sensor assembly 10 may be secured to the intake manifold 70 without the need of any tools or separate and distinct fasteners. Instead, an individual may simply insert the port 16 of the sensor assembly 10 into the opening 76 of the intake manifold 70, grasp a portion of the sensor assembly 10, and rotate the sensor assembly 10 with respect to the intake manifold 70 into a secure position, as described above. The locking latch 42 of the sensor assembly 10 may snapably and securely latch onto the catch 80 of the intake manifold 70, while the radial tab 30 of the sensor assembly 10 abuts into a portion of the arcuate wall 84 of the intake manifold 70, thereby securely and stably locking the sensor assembly 10 to the intake manifold 70.

The sensor assembly 10 may alternatively include more than one radial tab, while the intake manifold 70 may include more than one reciprocal arcuate wall, each of which may include an arcuate slots. Further, additional locking latches may be formed on the sensor assembly 10 that may be configured to latchably, snapably, or otherwise secure to a similar number of catches on the intake manifold 70.

Figure 12:
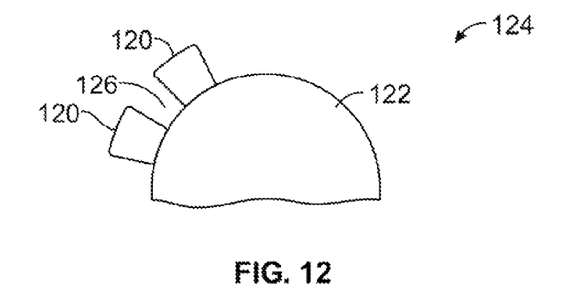
FIG. 12 illustrates a top view of radial tabs extending from a main body of a sensor assembly, according to an embodiment of the present disclosure.

FIG. 12 illustrates a top view of radial tabs 120 extending from a main body 122 of a sensor assembly 124, according to an embodiment of the present disclosure. As shown, instead of a single radial tab, embodiments of the present disclosure may include a plurality of radial tabs 120 separated by a gap 126.

Figure 13:
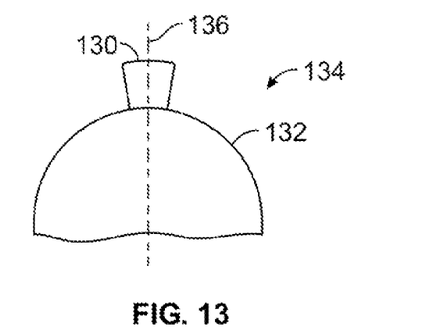
FIG. 13 illustrates a top view of a radial tab extending from a main body of a sensor assembly, according to an embodiment of the present disclosure.

FIG. 13 illustrates a top view of a radial tab 130 extending from a main body 132 of a sensor assembly 134, according to an embodiment of the present disclosure. In this embodiment, the radial tab 130 may simply be a tab positioned proximate to a longitudinal axis 136 of the sensor assembly 134. Instead of a radial tab covering an arcuate sweep of approximately 90°, for example, the radial tab 130 may simply cover a short arcuate sweep, such as less than 10°, and be configured to slide into an arcuate slot of an intake manifold (as described above), and abut against a barrier wall in a fully-secured position.

Figure 14:
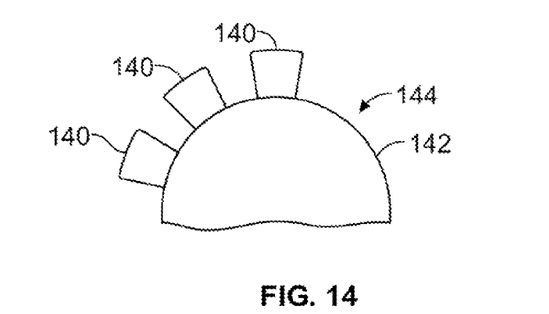
FIG. 14 illustrates a top view of three radial tabs extending from a main body of a sensor assembly, according to an embodiment of the present disclosure.

FIG. 14 illustrates a top view of three radial tabs 140 extending from a main body 142 of a sensor assembly 144, according to an embodiment of the present disclosure. In general, instead of a single radial tab, embodiments of the present disclosure may include two, three, or more radial tabs extending over an arcuate sweep of 90°, or an arcuate sweep that is greater or less than 90°.

Figure 15:
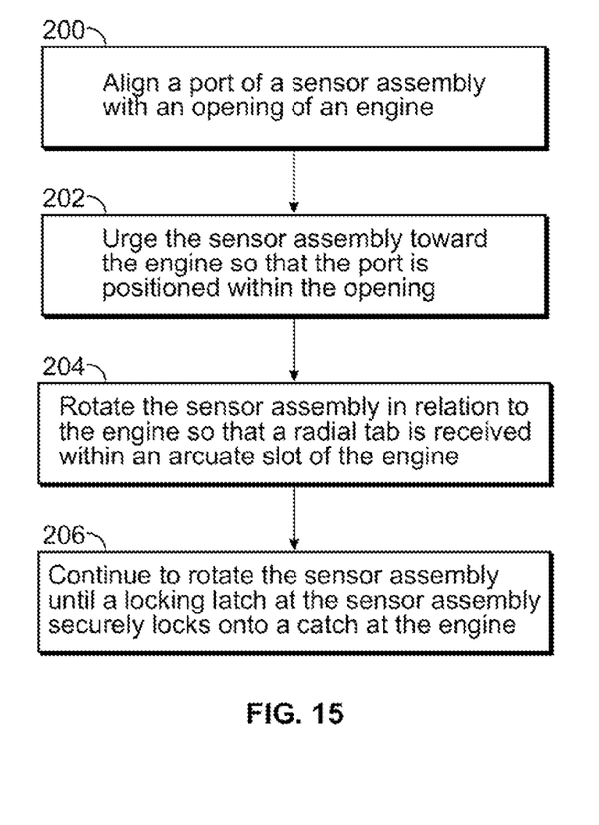
FIG. 15 illustrates a flow chart of a method of securely connecting a sensor assembly to a portion of an engine, according to an embodiment of the present disclosure.

FIG. 15 illustrates a flow chart of a method of securely connecting a sensor assembly, such as a manifold absolute pressure (MAP) sensor assembly, to a portion of an engine, according to an embodiment of the present disclosure. The process begins at 200, in which a port of the sensor assembly is aligned with an opening of a portion of an engine, such as an intake manifold. Next, at 202, the sensor assembly is urged toward the engine so that the port is positioned within the opening. After the port is positioned within the opening, at 204, an individual grasps and rotates the sensor assembly in relation to the engine so that a radial tab of the sensor assembly is slidably received within a reciprocal arcuate slot of the engine. The individual continues to rotate the sensor assembly in relation to the engine at 206 until a locking latch of the sensor assembly securely locks onto a catch of the engine. The interface between the locking latch and the catch prevents the sensor assembly from rotating in a retreating direction, while the radial tab may abut against a portion of the engine to prevent continued rotation of the sensor assembly in relation to the engine.

As described above, embodiments of the present disclosure provide a sensor assembly that may be quickly and easily connected to a portion of an engine without the use of separate and distinct fasteners or tools, such as a wrench. Instead, embodiments of the present disclosure provide a sensor assembly that may be securely connected to a portion of an engine by hand. For example, the radial tab 30 and the locking latch 42 cooperate and work together to secure the sensor assembly 10 to the intake manifold 70, as described above. As such, the time and cost of assembling an engine with such a sensor assembly are less than with respect to known sensors.

Unlike known sensors, embodiments of the present disclosure may not include metal compression limiters configured to receive and retain a separate and distinct fastener. Embodiments of the present disclosure provide a sensor assembly that may be devoid of three separate and distinct metal components that are commonly found in typical sensors and intake manifolds. In particular, embodiments of the present disclosure may be devoid a compression limiter, a separate and distinct fastener, such as a screw, and a metal insert within the intake manifold configured to receive the fastener. Accordingly, embodiments of the present disclosure provide a sensor assembly that may be securely connected to the intake manifold with less parts than are used with respect to known sensors.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

Various features of the disclosure are set forth in the following claims.

The invention claimed is:

1. A sensor assembly configured to be securely connected to a portion of a vehicle, the sensor assembly comprising:
    a main body;
    a connector shroud extending from the main body, wherein the connector shroud is configured to receive an electrical connector;
    a port extending from the main body, wherein the port is configured to be inserted into an opening formed in the portion of the vehicle;
    a deflectable locking member extending from the main body; and
    a radial tab extending from the main body, wherein the deflectable locking member and the radial tab cooperate to securely connect the sensor assembly to the portion of the vehicle.

2. The sensor assembly of claim 1, wherein the deflectable locking member comprises a locking latch extending from a distal end of a deflection beam that is separated from the main body by a gap, wherein the locking latch is configured to securely latch to a catch of the portion of the vehicle when the sensor assembly is rotated into a securing position with respect to the portion of the vehicle.

3. The sensor assembly of claim 2, wherein the deflectable locking member further comprises a blunted protuberance inwardly directed toward the main body, and wherein the blunted protuberance is configured to limit deflection of the deflection beam.

4. The sensor assembly of claim 1, wherein the radial tab is configured to be slidably received within an arcuate slot formed in the portion of the vehicle.

5. The sensor assembly of claim 3, wherein the radial tab includes a leading end configured to abut into a barrier wall of the portion of the engine when the sensor assembly is securely connected to the portion of the vehicle.

6. The sensor assembly of claim 1, wherein the sensor assembly is devoid of a compression limiter.

7. The sensor assembly of claim 1, wherein the sensor assembly is rotated with respect to the portion of the vehicle in a securing direction in order to securely connect the sensor assembly to the portion of the vehicle.

8. The sensor assembly of claim 1, wherein the sensor assembly is configured to securely connect to the portion of the vehicle without the use of a separate and distinct tool or a separate and distinct fastener.

9. The sensor assembly of claim 1, wherein the sensor assembly is a manifold absolute pressure (MAP) sensor assembly.

10. An engine system comprising:
    an intake manifold comprising an opening and a sensor-securing wall surrounding at least a portion of the opening, wherein the sensor-securing wall comprises a catch and an arcuate slot; and
    a sensor assembly configured to be securely connected to the intake manifold, the sensor assembly comprising:
       a main body;
       a connector shroud extending from the main body, wherein the connector shroud is configured to receive an electrical connector that electrically connects the sensor assembly to an engine control unit;
       a port extending from the main body, wherein the port is positioned within the opening of the intake manifold;
       a deflectable locking member extending from the main body, wherein the deflectable locking member is configured to securely latch onto the catch; and
       a radial tab extending from the main body, wherein the radial tab is configured to be retained within the arcuate slot, and wherein the deflectable locking member and the radial tab cooperate to securely connect the sensor assembly to the intake manifold.

11. The engine system of claim 10, wherein the deflectable locking member comprises a locking latch extending from a distal end of a deflection beam that is separated from the main body by a gap, wherein the locking latch is configured to securely latch to the catch when the sensor assembly is rotated into a securing position with respect to the intake manifold.

12. The engine system of claim 10, wherein the deflectable locking member further comprises a blunted protuberance inwardly directed toward the main body, and wherein the blunted protuberance is configured to limit deflection of the deflection beam.

13. The engine system of claim 10, wherein the radial tab is configured to be slidably received within the arcuate slot as the sensor assembly is rotated into a secure position with respect to the intake manifold.

14. The engine system of claim 13, wherein the intake manifold further comprises a barrier wall, and wherein the radial tab includes a leading end configured to abut into the barrier wall when the sensor assembly is securely connected to the intake manifold.

15. The engine system of claim 10, wherein the sensor assembly is devoid of a compression limiter.

16. The engine system of claim 10, wherein the sensor assembly is rotated with respect to the intake manifold in a securing direction in order to securely connect the sensor assembly to the intake manifold.

17. The engine system of claim 10, wherein the sensor assembly is configured to securely connect to the intake manifold without the use of a separate and distinct tool or a separate and distinct fastener.

18. The engine system of claim 10, wherein the sensor assembly is a manifold absolute pressure (MAP) sensor assembly.

19. An engine system comprising:
    an intake manifold comprising an opening and a sensor-securing wall surrounding at least a portion of the opening, wherein the sensor-securing wall comprises a catch, an arcuate slot, and a barrier wall at one end of the arcuate slot; and a sensor assembly configured to be securely connected to the intake manifold, the sensor assembly comprising:
- a main body;
- a connector shroud extending from the main body, wherein the connector shroud is configured to receive an electrical connector that electrically connects the sensor assembly to an engine control unit;
- a port extending from the main body, wherein the port is positioned within the opening of the intake manifold;
- a deflectable locking member extending from the main body, wherein the deflectable locking member is configured to securely latch onto the catch, wherein the deflectable locking member comprises: (a) a locking latch extending from a distal end of a deflection beam that is separated from the main body by a gap, wherein the locking latch is configured to securely latch to the catch when the sensor assembly is rotated into a securing position with respect to the intake manifold; and (b) a blunted protuberance inwardly directed toward the main body, and wherein the blunted protuberance is configured to limit deflection of the deflection beam; and
- a radial tab extending from the main body, wherein the radial tab is configured to be retained within the arcuate slot, and wherein the deflectable locking member and the radial tab cooperate to securely connect the sensor assembly to the intake manifold, wherein the radial tab is configured to be slidably received within the arcuate slot as the sensor assembly is rotated into a secure position with respect to the intake manifold, wherein the radial tab includes a leading end configured to abut into the barrier wall when the sensor assembly is securely connected to the intake manifold.

20. The engine system of claim 19, wherein the sensor assembly is devoid of a compression limiter, and wherein the sensor assembly is configured to securely connect to the intake manifold without the use of a separate and distinct tool or a separate and distinct fastener.

* * * * *